(No Model.)

J. McCASKEY & D. D. DOUDS.
Car Wheel.

No. 232,288.        Patented Sept. 14, 1880.

Witnesses:
N. C. McArthur
Douglas Pendleton

Inventors:
John McCaskey
David D. Douds
per
T. H. Alexander
Attorney.

UNITED STATES PATENT OFFICE.

JOHN McCASKEY AND DAVID D. DOUDS, OF NEW CASTLE, PENNSYLVANIA.

CAR-WHEEL.

SPECIFICATION forming part of Letters Patent No. 232,288, dated September 14, 1880.

Application filed June 24, 1880. (No model.)

*To all whom it may concern:*

Be it known that we, JOHN McCASKEY and DAVID D. DOUDS, both of New Castle, in the county of Lawrence and State of Pennsylvania, have invented certain new and useful Improvements in Car-Wheels; and we do hereby declare that the following is a full, clear, and exact description thereof, reference being had to the accompanying drawings, and to the letters of reference marked thereon, which form part of this specification.

The nature of our invention consists in the construction and arrangement of a car-wheel, as will be hereinafter more fully set forth, and pointed out in the claims.

In order to enable others skilled in the art to which our invention appertains to make and use the same, we will now proceed to describe its construction and operation, referring to the annexed drawings, in which—

Figure 1:
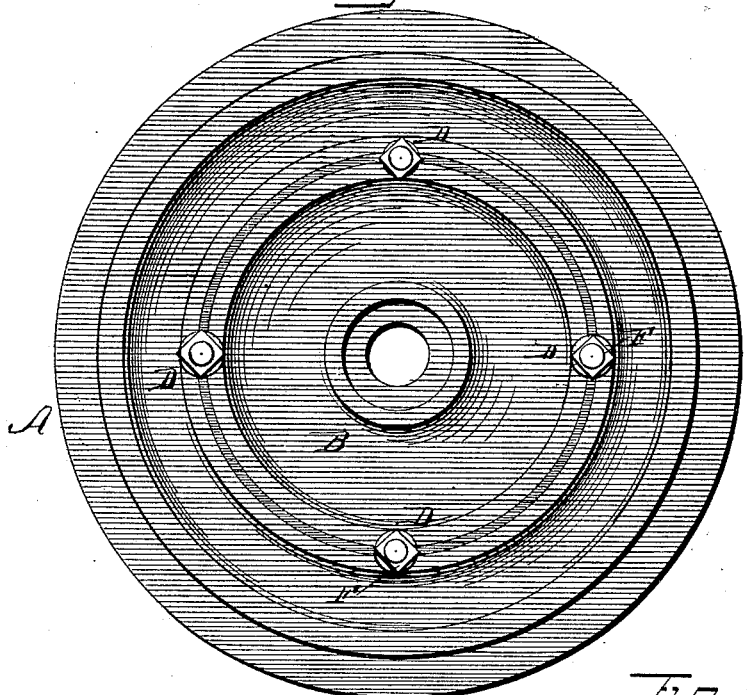
Figure 4:
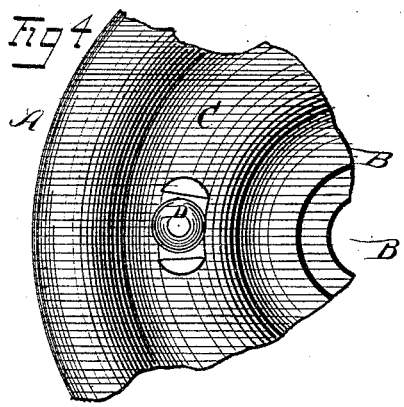
Figure 2:
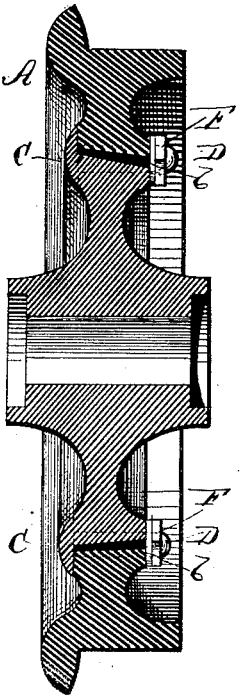

Figure 1 is a side elevation; Fig. 2, a central vertical section, and Figs. 3 and 4 detail views of parts of our invention.

Our car-wheel is made in two separate parts, the rim A and hub B. The rim A includes the tread and flange of the wheel, with a narrow portion of the web, and is cast of a combination of wrought and cast iron in such proportions — say, for instance, nineteen of wrought-iron to eighty-one of cast-iron—as will produce a hard and durable wheel.

The metal of the rim, extending only a short distance from the outer to the inner circumference, will not shrink, as is often the case in other wheels, but will remain of uniform thickness when taken out of the mold and cooled.

The hub B should be formed or cast with an inward bevel or slope, corresponding with a similar bevel on the inner edge of the rim, as shown in Fig. 2, and is made of cast-iron, and its outside diameter is about three-sixteenths of an inch, more or less, smaller than the inside diameter of the rim, so that when the two are put together a space will be left between them.

On one side the hub B is formed with a circumferential projecting flange, C, which overlaps the inner edge of the rim A, as shown. The inner edge of the rim and the outer edge of the hub are also formed with corresponding recesses or depressions *a a*, for the passage of two, three, or more equidistant bolts, D, for fastening the two parts of the wheel together. These bolts, in addition, also center the hub in the rim so as to be perfectly true. In the space left between the hub and rim is then run in molten zinc or other suitable soft metal, forming a filling, *b*, which hardens and unites the two parts together.

Before pouring in this filling pins *x x* are placed at the sides of the nuts F on the bolts D, which pins, after the filling is poured in, form nut-locks to prevent the nuts from coming loose.

It will be observed that from the bevel or slope given to the periphery of the hub the two parts may be easily separated and a new rim speedily put on, in the event of breakage of the old.

The zinc or other soft-metal filling forms a complete union between the rim and hub.

Figure 3:
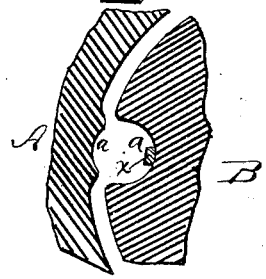

As it might be urged that the recessing of the bolt in the rim would form a check in it and render it liable to crack at this point, we have shown in Fig. 3 a modification by which the recess is entirely within the hub or center and the rim is equally strong at all points.

Having thus fully described our invention, what we claim as new, and desire to secure by Letters Patent, is—

1. The combination, in a car-wheel, of rim A and hub B, the inner circumference of the former and periphery of the latter being somewhat slanting, with a space between, extending from side to side, in which a soft-metal filling is run, substantially as and for the purpose set forth.

2. The two parts A and B of a two-part car-wheel, formed with corresponding recesses or grooves for the admission of bolts to hold the parts together and center the hub within the rim, substantially as herein set forth.

3. The combination of the rim A, hub B, provided with the flange C, bolts D, and soft-metal filling *b*, substantially as and for the purposes herein set forth.

4. The combination, with the rim A and hub B, of the bolts D, nuts F, pins *x*, and soft-metal filling *b*, substantially as and for the purposes herein set forth.

In testimony that we claim the foregoing as our own we affix our signatures in presence of two witnesses.

JOHN McCASKEY.
DAVID D. DOUDS.

Witnesses:
I. P. LESLIE,
S. E. TYLER.